United States Patent
Robeson et al.

(10) Patent No.: US 11,073,398 B2
(45) Date of Patent: Jul. 27, 2021

(54) ROADWAY DRIVABILITY ASSESSMENT FOR MAPPING AND NAVIGATION

(71) Applicant: International Business Machines Corporation, Armonk, NY (US)

(72) Inventors: Kyle D. Robeson, North York (CA); Ramesh Raj, Markham (CA); Zhao Cheng, Markham (CA); Luyao Li, Markham (CA)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/524,257

(22) Filed: Jul. 29, 2019

(65) Prior Publication Data

US 2021/0033403 A1    Feb. 4, 2021

(51) Int. Cl.
*G01C 21/28*        (2006.01)
*G06F 16/29*        (2019.01)
(Continued)

(52) U.S. Cl.
CPC ......... *G01C 21/28* (2013.01); *G01C 21/3461* (2013.01); *G01C 21/3667* (2013.01);
(Continued)

(58) Field of Classification Search
CPC G01C 21/28; G01C 21/3667; G01C 21/3461; G06F 16/29; G07C 5/008; G07C 5/02
See application file for complete search history.

(56) References Cited

U.S. PATENT DOCUMENTS 9,475,500 B2    10/2016   Grimm et al.
9,616,897 B2 *    4/2017   Powers ................. G08G 1/015
(Continued)

FOREIGN PATENT DOCUMENTS

WO     2016160206 A1    10/2016

OTHER PUBLICATIONS

Wikipedia, "Coefficient of friction", From Wikipedia, the free encyclopedia, last changed on Apr. 5, 2019, printed May 30, 2019, 2 pages, https://simple.wikipedia.org/wiki/Coefficient_of_friction.
(Continued)

*Primary Examiner* — Donald J Wallace
(74) *Attorney, Agent, or Firm* — Stosch Sabo

(57) ABSTRACT

Described herein are techniques for generating and utilizing drivability maps. The techniques including a method comprising receiving a set of vehicle performance records including a first vehicle performance record comprising a vehicle location, a vehicle configuration, and traction control system information. The method further includes determining, from the set of vehicle performance records, a respective Coefficient of Friction (CoF) value for respective road segments including a first CoF value for a first road segment. The method further includes determining, from the set of vehicle performance records and the respective CoF values, a first CoF threshold for a first vehicle configuration. The method further includes generating a drivability map for the first vehicle configuration indicating different levels of drivability for different road segments based on the respective CoF values for respective road segments and the first CoF threshold for the first vehicle configuration.

20 Claims, 6 Drawing Sheets

(51) Int. Cl.
*G01C 21/36* (2006.01)
*G07C 5/00* (2006.01)
*G07C 5/02* (2006.01)
*G01C 21/34* (2006.01)

(52) U.S. Cl.
CPC ............ *G06F 16/29* (2019.01); *G07C 5/008* (2013.01); *G07C 5/02* (2013.01)

(56) References Cited

U.S. PATENT DOCUMENTS

| | | | |
|---|---|---|---|
| 2010/0245123 | A1 | 9/2010 | Prasad et al. |
| 2015/0307109 | A1* | 10/2015 | Graf ...................... B60W 10/06 701/22 |
| 2016/0133131 | A1* | 5/2016 | Grimm ............ G08G 1/096725 701/117 |
| 2016/0137208 | A1* | 5/2016 | Powers ................. B60W 30/00 701/36 |
| 2016/0280224 | A1* | 9/2016 | Tatourian ............. G08G 1/0116 |
| 2019/0100216 | A1* | 4/2019 | Volos ...................... G01S 19/42 |
| 2019/0135300 | A1* | 5/2019 | Gonzalez Aguirre ...................... G06N 3/088 |
| 2020/0033137 | A1* | 1/2020 | Hartmann .............. G01C 21/32 |

OTHER PUBLICATIONS

Chaey, C., "Google Maps Will Now Show You Real-Time Accidents, Construction, and Road Closures", Aug. 20, 2013, 5 pages, https://www.fastcompany.com/3016050/google-maps-will-now-show-you-real-time-accidents-construction-and-road-closures.

Unknown, "Free Driving Directions and Live Traffic Map App by Waze", printed May 24, 2019, 7 pages. https://www.waze.com/.

IBM, "Real time route update in navigation systems using vehicle and driver data", An IP.com Prior Art Database Technical Disclosure, IP.com No. IPCOM000181701D, IP.com Electronic Publication Date: Apr. 9, 2009, 4 pages.

Mell et al., "The NIST Definition of Cloud Computing", Recommendations of the National Institute of Standards and Technology, Sep. 2011, 7 pages.

\* cited by examiner

ROADWAY DRIVABILITY ASSESSMENT FOR MAPPING AND NAVIGATION

BACKGROUND

The present disclosure relates to vehicular mapping and navigation, and, more specifically, to using crowd-sourced data to provide roadway drivability assessments to vehicles.

Roadway drivability is characterized by many attributes, including weather attributes, road attributes, and vehicle attributes. Some vehicular navigation systems (whether incorporated into a vehicle console or used on a personal computing device within a vehicle) can generate routes between a start location and an end location using maps of roadways together with information related to road construction, road closures, accidents, and/or traffic conditions.

SUMMARY

Aspects of the present disclosure are directed toward a computer-implemented method comprising receiving a set of vehicle performance records including a first vehicle performance record comprising a vehicle location, a vehicle configuration, and traction control system information. The method further comprises determining, from the set of vehicle performance records, a respective Coefficient of Friction (CoF) value for respective road segments including a first CoF value for a first road segment. The method further comprises determining, from the set of vehicle performance records and the respective CoF values, a first CoF threshold for a first vehicle configuration. The method further comprises generating a drivability map for the first vehicle configuration indicating different levels of drivability for different road segments based on the respective CoF values for respective road segments and the first CoF threshold for the first vehicle configuration.

Additional aspects of the present disclosure are directed to systems and computer program products configured to perform the method described above.

Further aspects of the present disclosure are directed toward a system comprising a server and a navigation console. The server stores crowd-sourced vehicle performance records including traction control system information, coefficient of friction (CoF) values for road segments, where the CoF values are based on the crowd-sourced vehicle performance records, and CoF thresholds for vehicle configurations, where the CoF threshold are based on the crowd-sourced vehicle performance records. The server further stores drivability maps for respective vehicle configurations indicating passable and impassable road segments based on the CoF values and the CoF thresholds. The navigation console is associated with a vehicle having a first vehicle configuration. The navigation console stores a drivability map for the first vehicle configuration that is received from the server. Further, the navigation console stores a route for the vehicle that is based on the drivability map.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
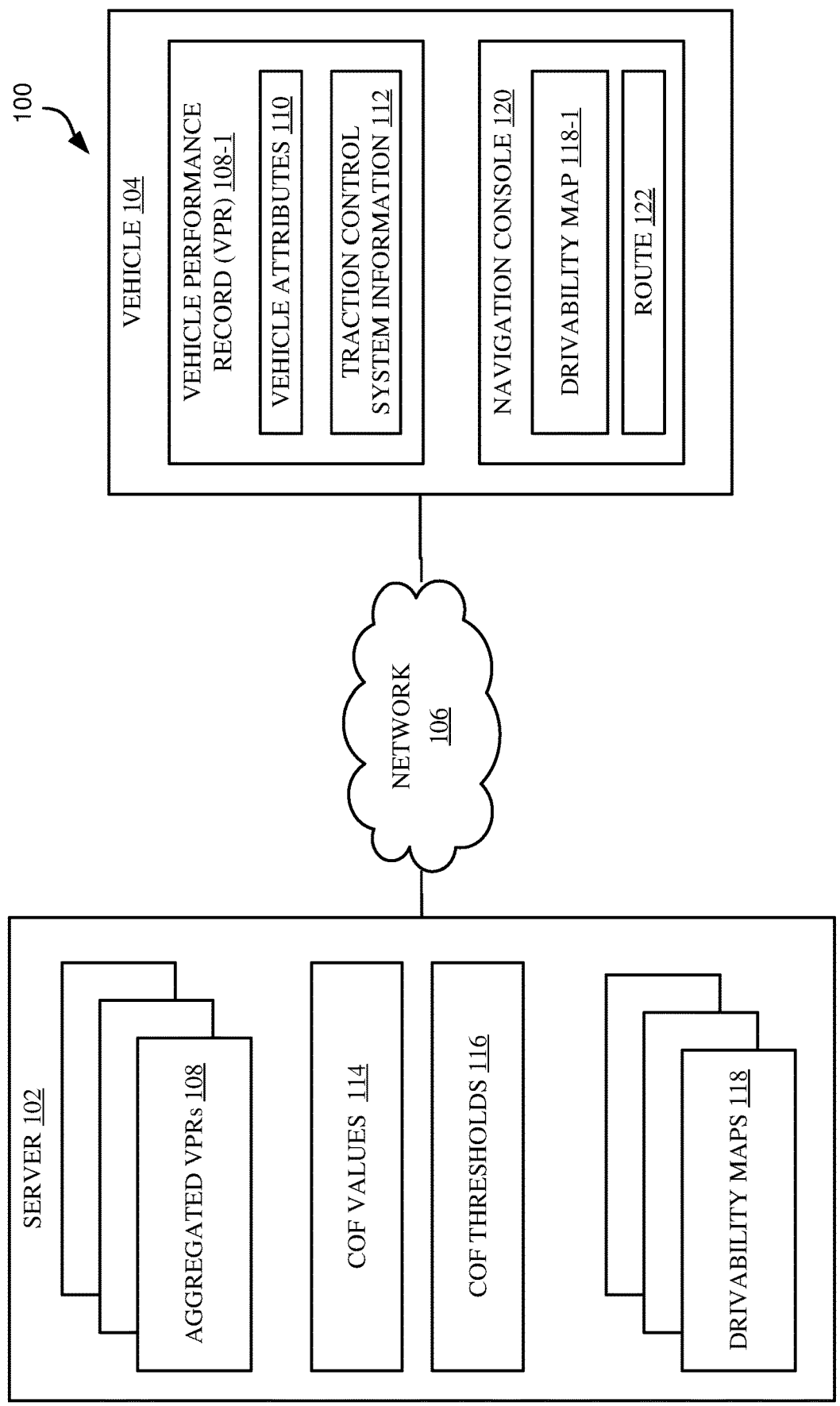
FIG. 1 illustrates a block diagram of an example computing environment for generating and utilizing drivability maps, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward vehicular mapping and navigation, and, more specifically, to using crowd-sourced data to provide roadway drivability assessments to vehicles. While not limited to such applications, embodiments of the present disclosure may be better understood in light of the aforementioned context.

Roadway drivability can be based on many factors. For example, weather conditions (e.g., dry, rain, snow, sleet, etc.) can alter the traction characteristics of a roadway. These changes in traction can be exacerbated by a type of road (e.g., paved, gravel, etc.), a road grade (e.g., hills), road curvature, and the like. Thus, there are many factors related to roadway drivability for any individual vehicle configuration.

Further, there are also many types of vehicle configurations that travel on roadways. Attributes such as vehicle weight, vehicle ground clearance, drivetrain configuration, engine configuration, traction control systems, stability control systems, assisted braking systems, tire types, tire tread, wheel types, tire accessories (e.g., tire chains), and many other attributes contribute to an individual vehicle's ability or inability to successfully navigate a certain portion of a certain road during certain weather conditions.

The variety of vehicle attributes together with the dynamic nature of weather make the technical challenge of providing customized drivability assessments to a particular vehicle during an impermanent weather event particularly well-suited for real-time, crowd-sourced data. Aspects of the present disclosure are directed toward aggregating vehicle data, analyzing the aggregated data, and providing customized drivability maps to navigation consoles in approximately real-time, where the drivability maps enable vehicles associated with the navigation consoles to follow safe driving routes with a low probability of becoming immobilized due to poor roadway traction.

Aspects of the present disclosure realize numerous advantages and improvements over the current state of art in vehicular mapping and navigation. A first example advantage relates to the quality of the input data resulting in improved drivability maps. Namely, the data is received in real-time from a variety of vehicles in a variety of locations. Thus, aspects of the present disclosure can tailor drivability maps to a particular vehicle configuration according to driving conditions in a particular location based on real-time information.

A second example advantage relates to improved drivability maps insofar as the drivability maps are generated based on a Coefficient of Friction (CoF) value for respective road segments. The CoF values for respective road segments can be compared to respective CoF thresholds for various vehicle configurations. Using CoF values (for various roads) and CoF thresholds (for various vehicle configurations) has multiple benefits including, for example, (1) CoF values (for various roads) can be calculated from existing traction control system information at a given location; and (2) CoF thresholds (for various vehicle configurations) can simplify the complex interrelations between vehicle weight, vehicle drivetrain, tire configuration, and/or other factors contributing to vehicle tractability. Thus, CoF values can be calculated using existing data without the need for additional sensors to be outfitted to a vehicle. Further, CoF values and CoF thresholds provide an accurate approximation for drivability.

A third example advantage relates to improved utilization of the generated drivability maps insofar as (1) a customized drivability map can be provided to each vehicle based on the vehicle's configuration; (2) drivability map updates can be provided to navigation consoles in real-time, thereby enabling route-generation using recently collected and evaluated data; and (3) the drivability maps having high usability insofar as they can function as a separate application or as a layer that is interoperable with an existing mapping and navigation application.

The aforementioned advantages are example advantages, and embodiments of the present disclosure can exist that contain all, some, or none of the aforementioned advantages while remaining within the spirit and scope of the present disclosure.

Referring now to FIG. 1, illustrated is a block diagram of an example computing environment 100 for generating and utilizing drivability maps, in accordance with some embodiments of the present disclosure. FIG. 1 includes a server 102 communicatively coupled to a vehicle 104 via a network 106. While a single vehicle 104 is shown in FIG. 1 for ease of discussion, in reality, many vehicles (e.g., tens, hundreds, thousands, or more) can be permanently or intermittently communicatively coupled to server 102 in, for example, an Internet of Things (IoT) configuration or another configuration benefiting from the continuous or intermittent interconnection between numerous devices. Likewise, network 106 is shown for ease of discussion, but in reality, many permanent or intermittent networks of similar or dissimilar types can be used to connect multiple vehicles 104 to server 102. As non-limiting examples, network 106 can include a wide-area network (WAN), a local area network (LAN), an intranet, the Internet, a cellular network (e.g., 3G, 4G, 5G), a personal-area network (PAN), or the like.

Vehicle 104 can generate a vehicle performance record (VPR) 108-1. In some embodiments, VPR 108-1 can be collected in response to a stimulus, such as in response to activation of a traction control system, electronic stability system, all-wheel drive system, four-wheel drive system, anti-lock braking system, or another system in vehicle 104 that is triggered during driving in sub-optimal roadway conditions. VPR 108-1 can include vehicle attributes 110 and traction control system information 112. Vehicle attributes 110 can include data related to for example, vehicle location, vehicle type (e.g., sedan, sport-utility vehicle, van, truck, etc.), vehicle model (e.g., vehicle make, model, and/or year), vehicle weight, vehicle drivetrain configuration (e.g., two-wheel drive, front-wheel drive (FWD), rear-wheel drive (RWD), all-wheel drive (AWD), four-wheel drive (4WD), etc.), vehicle tire configuration such as type of tires (e.g., snow tires, studded snow tires, all-season tires, etc.), tire sizes, tire tread characteristics, tire accessories (e.g., tire chains), and/or other data.

Traction control system information 112 can include information related to roadway tractability, drivability, and/or slipperiness. Traction control system information 112 can include any type of information that is received at, analyzed by, and/or output by a vehicle's traction control system, electronic stability control system, vehicle stability control system, dynamic stability control system, drivetrain system, anti-lock braking system, or another system configured to monitor, manage, or improve drivability in sub-optimal roadway conditions. For example, traction control system information 112 can include information related to vehicle location (e.g., Global Positioning System (GPS) coordinates), vehicle speed (e.g., GPS coordinates over a time interval, wheel speed sensor data, longitudinal accelerometer data, lateral accelerometer data, etc.), acceleration, deceleration, braking, engine power, engine torque, vehicle weight values (e.g., weight per wheel), and the like.

Customized functions can be used to interrelate various data in traction control system information 112. As one example, a function could be used to characterize slipperiness on a road that can use a speed of the vehicle and a Rotations Per Minutes (RPM) reading of the engine as inputs. In situations where speed is relatively lower than expected and RPM is relatively higher than expected, this combination can suggest the road is slippery and the tires are spinning with little or no traction when power is supplied from the engine through the drivetrain.

Traction control system information 112 can also include data related to steering such as an orientation of the steering wheel (e.g., from a steering wheel angle sensor), a direction of travel of the vehicle, a characterization of vehicle drift, sway, and/or rotation (e.g., from a yaw rate sensor and/or a roll rate sensor), and the like. Steering information can be useful for characterizing adverse roadway conditions that result in spinning, drifting, sliding, or otherwise lacking drivability as a result of impaired steering.

Traction control system information 112 can also include environmental factors, such as, for example, a road grade (e.g., slope), an outside temperature, a moisture indicator, and/or other environmental factors that can be relevant to driving in sub-optimal conditions. Environmental factors can be useful for inferring weather conditions such as snow, rain, flooding, and so on.

Vehicle 104 can transmit VPR 108-1 to server 102 via network 106. Server 102 can store aggregated VPRs 108 from many vehicles (e.g., hundreds, thousands, etc.). Aggregated VPRs 108 can be received in real-time on a continuous or semi-continuous basis.

Server 102 can utilize aggregated VPRs 108 to generate Coefficient of Friction (CoF) values 114 for respective road segments. The coefficient of friction ($\mu$) can be calculated according to Equation 1:

$$\mu = F_f/F_n \quad \text{Equation 1:}$$

In Equation 1, $F_f$ can be the frictional force whereas $F_n$ can be the normal force. The frictional force ($F_f$) can be based on numerous factors according to various embodiments. At a high level, the frictional force ($F_f$) can be based on a power output by the engine and/or a braking resistance by a braking system relative to a distance traveled (and optionally compared to an expected distance traveled for the aforementioned inputs under normal driving conditions). In some embodiments, the frictional force ($F_f$) can be a function of the traction control system information 112 and, optionally, the vehicle weight. The normal force ($F_n$) can be based on a vehicle weight and a road grade (e.g., slope).

CoF values 114 can be generated based on analyzing aggregated VPRs 108. For example, aggregated VPRs 108 can be analyzed by algorithmic functions, machine learning, deep learning, and the like. CoF values 114 include a respective CoF value for respective road segments of respective roads, where different road segments can be similar or dissimilar in length. For example, a long flat road segment followed by a sharp uphill road segment, followed by a moderate downhill road segment can each be characterized as different road segments and each have different lengths. In other embodiments, all road segments have a same or similar length (e.g., 100 feet, 100 yards, 0.5 miles, 1.0 mile, etc.).

Server 102 can also utilize aggregated VPRs 108 to generate CoF thresholds 116 for respective vehicle configurations. Vehicles can be classified into a vehicle configuration according to any number of individual parameters or combinations of multiple parameters. For example, vehicle configurations can be defined according to vehicle attributes 110 such as vehicle type, vehicle weight, vehicle drivetrain configuration, vehicle tire configuration, and the like. CoF thresholds 116 indicate a minimum CoF value 114 that a given vehicle configuration can safely navigate. As will be appreciated by one skilled in the art, a 5,000-pound sport-utility vehicle outfitted with studded snow tires and four-wheel drive capability will have a lower CoF threshold 116 compared to a 3,000-pound sedan with all-season tires and front-wheel drive.

In various embodiments, CoF thresholds 116 can be static or variable. As one example, a CoF threshold 116 can be variable and change as a function of road grade (incline or decline). Thus, a CoF threshold 116 may be lower for approximately horizontal roads and higher for steep hills. This correlates to the intuitive notion that a vehicle driving up a hill will need to generate more power (with sufficient traction) to overcome the gravitational force of the vehicle's weight "pulling" the vehicle down the hill. As another example, a CoF threshold 116 can be variable and change as a function of vehicle speed. For example, a vehicle configuration may have a lower CoF threshold 116 at lower speeds and a higher CoF threshold 116 at higher speeds insofar as, for example, a vehicle traveling faster can abruptly lose control on an icy road compared to a vehicle traveling slowly.

Server 102 utilizes CoF values 114 and CoF thresholds 116 to generate a plurality of customized drivability maps 118, where each drivability map 118 is customized for a particular vehicle configuration according to the CoF threshold 116 for that vehicle configuration.

Server 102 can transmit a drivability map 118-1 for a first vehicle configuration to a navigation console 120 associated with vehicle 104 having the first vehicle configuration via network 106. The navigation console 120 can be configured to present the drivability map 118-1 on its own or as a layer presented overtop a pre-existing mapping and navigation application residing within navigation console 120. Navigation console 120 can utilize drivability map 118-1 to generate a route 122, where the generated route 122 avoids road segments with CoF values 114 below the CoF threshold 116 for the vehicle 104 and utilizes road segments with CoF values 114 above the CoF threshold 116 for the vehicle 104.

Navigation console 120 can be integrated into vehicle 104, communicatively coupled to vehicle 104, or residing within vehicle 104 without being necessarily coupled to vehicle 104. For example, the navigation console 120 can be as simple as a smartphone capable of presenting maps and generating routes according to the maps.

Figure 2:
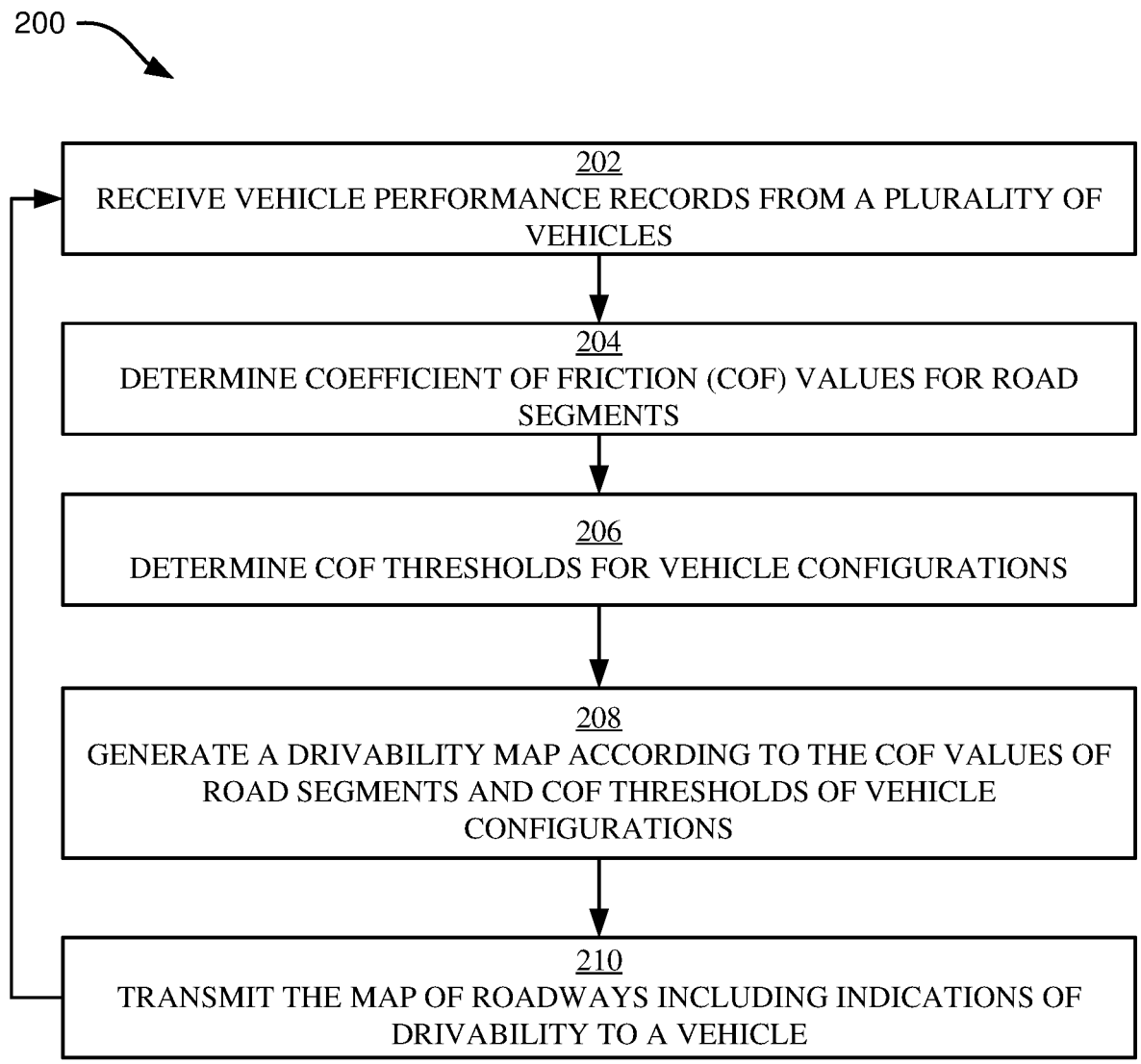
FIG. 2 illustrates a flowchart of an example method for generating drivability maps, in accordance with some embodiments of the present disclosure.

Referring now to FIG. 2, illustrated is a flowchart of an example method 200 for generating and utilizing drivability maps 118, in accordance with some embodiments of the present disclosure. In some embodiments, the method 200 is implemented by a server 102 or a different configuration of hardware and/or software.

In operation 202, the server 102 receives aggregated VPRs 108 from a plurality of vehicles 104 via network 106. The aggregated VPRs 108 can be received in batches, intermittently, continuously, and/or semi-continuously. In some embodiments, the aggregated VPRs 108 are received in approximately real-time (or near real-time insofar as there are delays associated with data aggregation, preparation, and transmission).

In operation 204, the server 102 determines CoF values 114 for respective road segments based on the aggregated VPRs 108. As previously discussed, CoF values 114 can be determined based on one or more of a road grade, a vehicle weight, a vehicle configuration, traction control system information 112, and/or other information.

In operation 206, the server 102 determines CoF thresholds 116 for respective vehicle configurations by analyzing the aggregated VPRs 108 received in operation 202 together with the CoF values 114 determined in operation 204. Vehicle configurations can be based on any number of parameters including, but not limited to, vehicle type, vehicle weight, drivetrain configuration, tire configuration, and so on. A CoF threshold 116 can indicate a certain CoF value 114 below which the given vehicle configuration will have a low probability of safely traversing the road segment having the CoF value 114 below the CoF threshold 116.

In operation 208, the server 102 generates drivability maps 118 according to the CoF values 114 and the CoF thresholds 116. The drivability maps 118 can indicate sections of roads that are likely drivable and sections of roads that are likely impassable (or unsafe) for various vehicle configurations. The drivability maps 118 can display these drivability metrics using colors, symbols, shading, and/or other visual mechanisms useful for conveying information. Further, the drivability maps 118 can be associated with audio warnings (e.g., alarms, voice messages, etc.) and/or textual warnings useful for identifying roadways having CoF values 114 below the CoF threshold 116 for a given vehicle configuration.

In operation 210, the server 102 transmits a drivability map 118-1 for a first vehicle configuration to a navigation console 120 of a vehicle 104 having the first vehicle configuration using a network 106. The navigation console 120 can subsequently utilize the drivability map 118-1 to generate a route 122 utilizing roads with CoF values 114 above the CoF threshold 116 for the first vehicle configuration and not utilizing roads with CoF values 114 below the CoF threshold 116 for the first vehicle configuration.

As shown, the method 200 can return to operation 202 and receive updated VPRs 108 and again proceed through the method 200 before transmitting an updated drivability map 118-1 to navigation console 120 in another iteration of operation 210. Thus, aspects of the present disclosure intermittently provide an updated drivability map 118-1 to navigation console 120, thereby enabling navigation console 120 to use approximately real-time data to plan and implement a safe route 122.

Although not explicitly shown, the method 200 can also generate and transmit a route 122 to the navigation console 120, where the navigation console can provide a starting location, an ending location, and a vehicle configuration to the server 102. The server 102 can then determine a CoF threshold 116 for the given vehicle configuration, select the appropriate drivability map 120, determine a route 122 using the appropriate drivability map 120, and transmit the route 122 to the navigation console 120. These embodiments can be useful in situations where the navigation console 120 may have limited network bandwidth for downloading drivability map 120-1 and/or limited processing power for computing a route 122 using the drivability map 120-1.

Figure 3A:
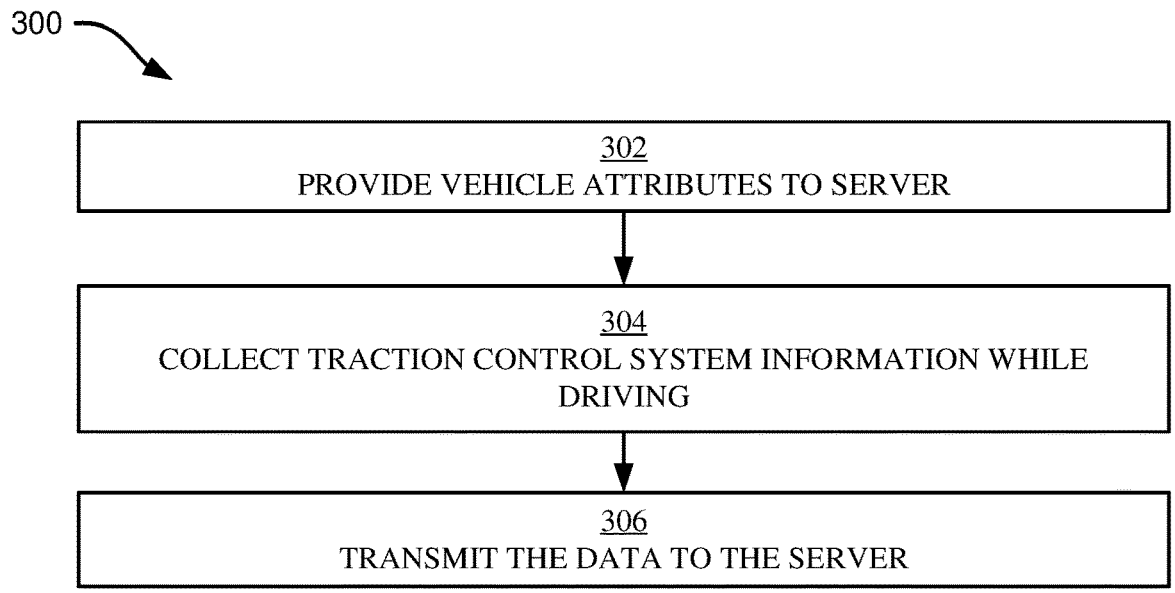
FIG. 3A illustrates a flowchart of an example method for transmitting vehicle performance records (VPRs) from a vehicle to a server, in accordance with some embodiments of the present disclosure.

Referring now to FIG. 3A, illustrated is a flowchart of an example method 300 for transmitting a VPR 108-1 from a vehicle 104 to a server 102, in accordance with some embodiments of the present disclosure. In some embodiments, the method 300 can be implemented by a vehicle 104 or a different configuration of hardware and/or software. In some embodiments, the method 300 occurs prior to operation 202 of FIG. 2.

In operation 302, the vehicle 104 provides vehicle attributes 110 to server 102. Operation 302 can be, for example, a registration process whereby a user enters vehicle attributes 110 into the vehicle 104 and/or the vehicle 104 compiles known vehicle attributes 110 about itself. Vehicle attributes 110 can include, for example, a vehicle type, a vehicle weight, a drivetrain configuration, a tire configuration, driving habits of the user, and so on. In some embodiments, a user inputs tire configuration information to reflect a tire type (e.g., all-season, winter, studded, etc.), a tire classification (e.g., a tire size, a tire rating, etc.), and/or tire accessories (e.g., tire chains) that may not be automatically retrievable by the vehicle 104.

In operation 304, the vehicle 104 collects traction control system information 112 while driving. In some embodiments, the collected information constitutes information related to location, distance traveled, tire rotations, engine output, braking output, and/or other information. In some embodiments, operation 304 occurs in response to activation of a traction control system of the vehicle 104.

In operation 306, the vehicle 104 transmits the VPR 108-1 to the server 102 via the network 106. Operation 306 can occur continuously, semi-continuously, and/or intermittently. For example, operation 306 can begin transmitting traction control system information 112 to the server 102 when the traction control system is activated. As another example, operation 306 can begin transmitting traction control system information 112 to the server 102 after the traction control system deactivates from an activated state. As another example, operation 306 can begin transmitting traction control system information 112 to the server 102 once the vehicle returns home and connects to a household network.

Figure 3B:
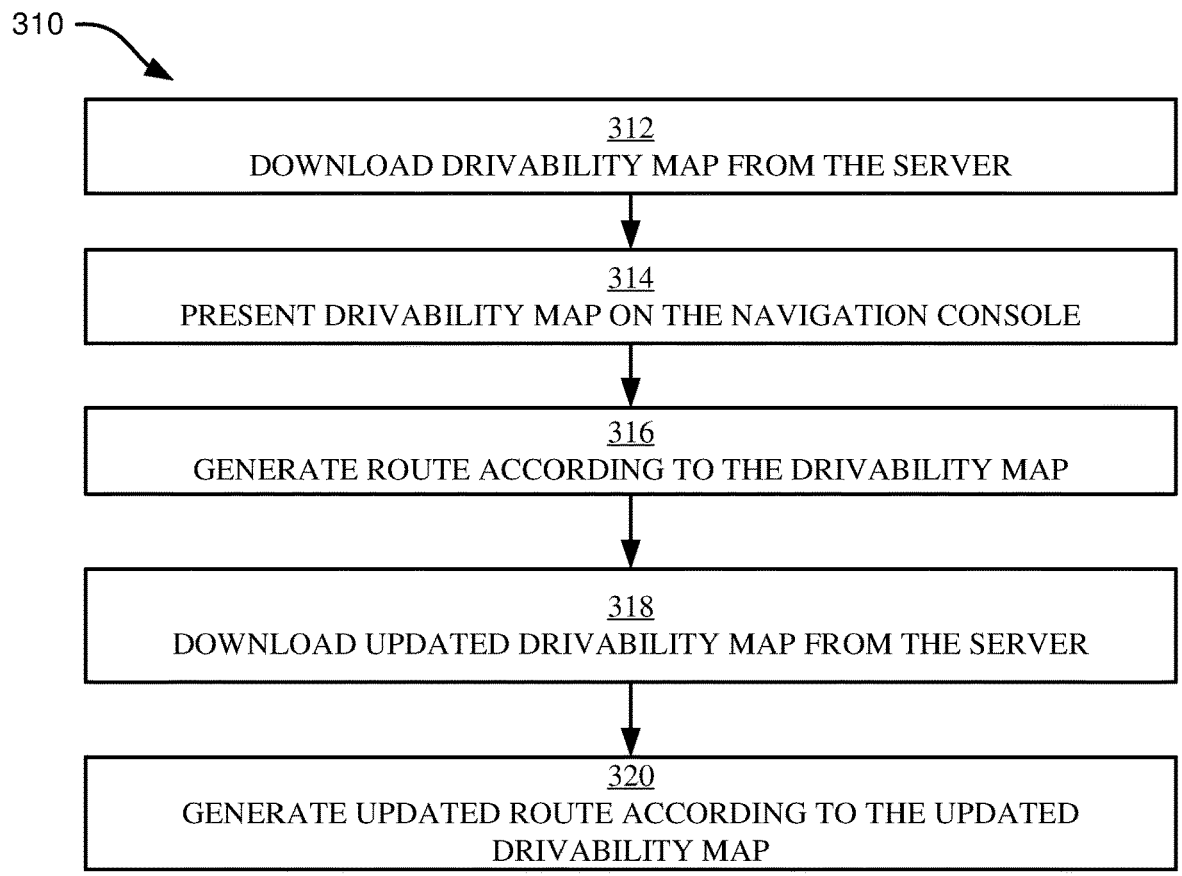
FIG. 3B illustrates a flowchart of an example method for utilizing drivability maps at a navigation console, in accordance with some embodiments of the present disclosure.

Referring now to FIG. 3B, illustrated is a flowchart of an example method 310 for utilizing a drivability map 118-1 at a navigation console 120, in accordance with some embodiments of the present disclosure. In some embodiments, the method 310 can be implemented by a navigation console 120 or a different configuration of hardware and/or software. In some embodiments, the method 310 occurs after operation 210 of FIG. 2.

In operation 312, the navigation console 120 downloads a drivability map 118-1 from server 102 via network 106. The drivability map 118-1 can be generated for a vehicle configuration matching a vehicle configuration of the vehicle 104.

In operation 314, the navigation console 120 presents the drivability map 118-1 to an interface of navigation console 120. In some embodiments, operation 314 constitutes adding the drivability map 118-1 as a layer (e.g., an overlay) of an existing map stored within the navigation console 120. Drivability map 118-1 can including coloring, shading, symbols, and/or other infographics capable of indicating CoF values 114 relative to CoF threshold 116 (e.g., greater than or less than) for respective road segments shown on the map.

In operation 316, the navigation console 120 generates a route 122 based on the drivability map 118-1. The route 122 can be configured to avoid portions indicated as likely impassable or unsafe according to the drivability map 118-1 (e.g., portions having CoF values 114 less than the CoF threshold 116 for the vehicle 104).

In operation 318, the navigation console 120 downloads an updated drivability map 118-1 from the server 102 via the network 106. The updated drivability map 118-1 can include updated CoF values 114 and/or updated CoF thresholds 116 based on updated aggregated VPRs 108. In operation 320, the navigation console generates an updated route 122 based on the updated drivability map 118-1 downloaded in operation 318.

Figure 4:
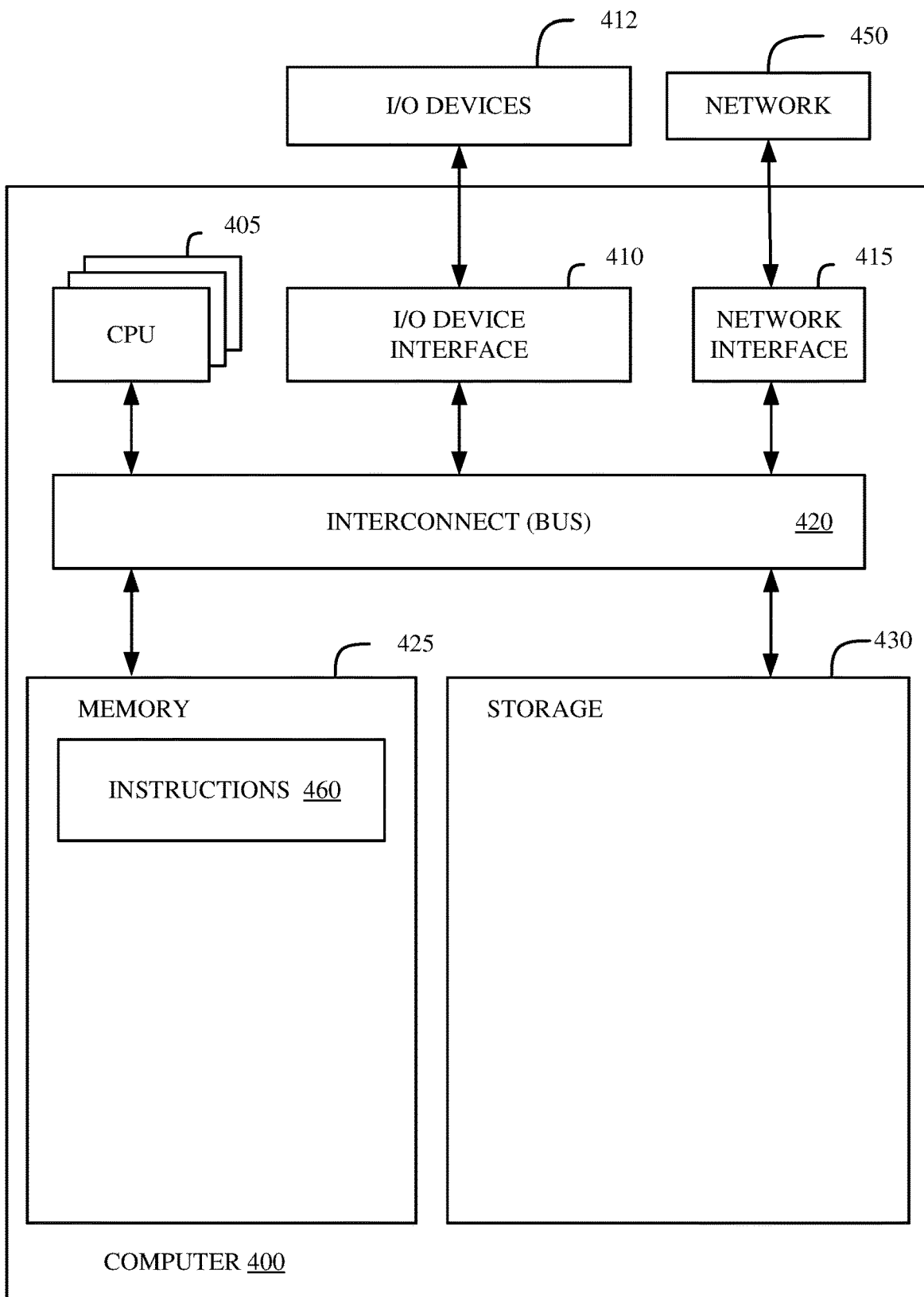
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform the methods described in FIGS. 2-3 and/or implement the functionality discussed in FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into one or more of the server 102, the vehicle 104, and/or the navigation console 120.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU

405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be processor-executable instructions for performing any portion of, or all of, any of the methods of FIGS. 2-3 and/or implementing any of the functionality discussed in FIG. 1.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
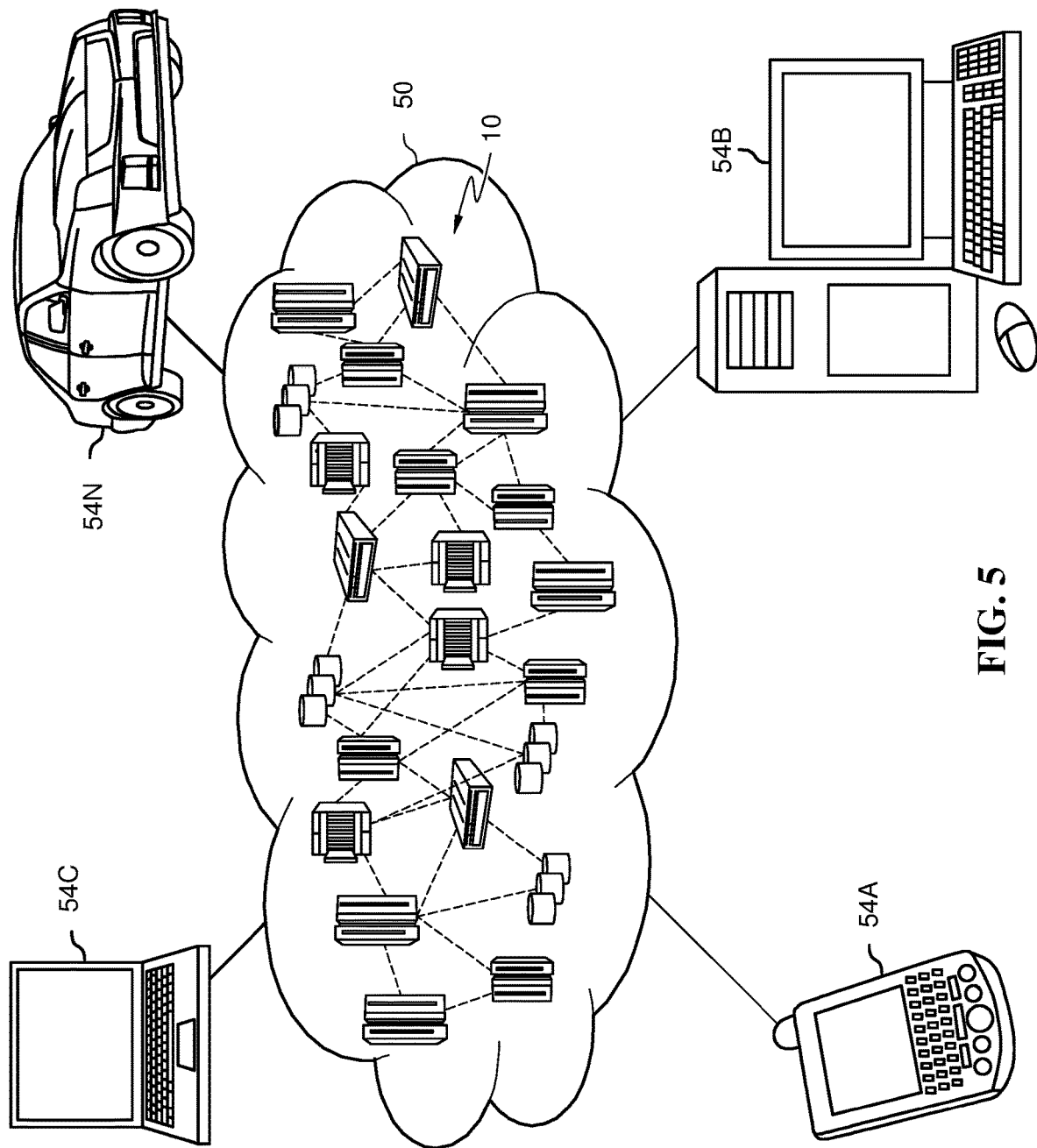
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
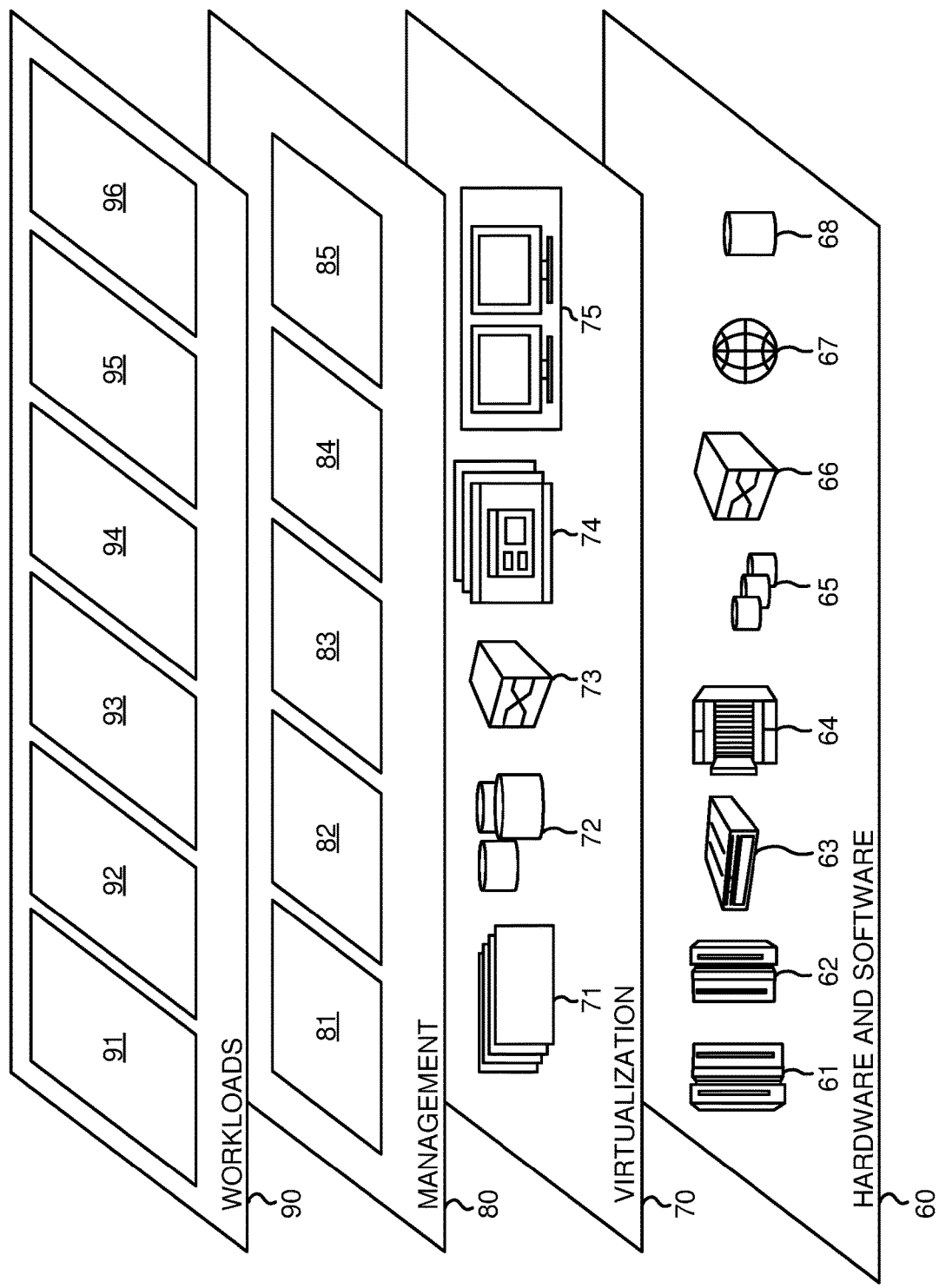
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drivability-based navigation 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described with respect to FIGS. 2-3 and/or any of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
   receiving a set of vehicle performance records including a first vehicle performance record comprising a vehicle location, a vehicle configuration, and traction control system information;
   determining, from the set of vehicle performance records, a respective Coefficient of Friction (CoF) value for respective road segments including a first CoF value for a first road segment;
   determining, from the set of vehicle performance records and the respective CoF values, a first CoF threshold for a first vehicle configuration; and
   generating a drivability map for the first vehicle configuration indicating different levels of drivability for different road segments based on the respective CoF values for respective road segments and the first CoF threshold for the first vehicle configuration.

2. The method of claim 1, wherein the set of vehicle performance records is received in real-time from a plurality of driving vehicles.

3. The method of claim 1, wherein the vehicle configuration includes a vehicle type, a vehicle weight, a vehicle drivetrain configuration, and a vehicle tire configuration.

4. The method of claim 1, wherein the drivability map classifies road segments with CoF values below the first CoF threshold as unsafe.

5. The method of claim 1, wherein the first CoF value is calculated according to a frictional force divided by a normal force, wherein the frictional force is a function of the traction control system information, and wherein the normal force is a function of a road grade and a vehicle weight.

6. The method of claim 1, wherein the method further comprises:
   transmitting the drivability map to a navigation console of a vehicle having the first vehicle configuration.

7. The method of claim 6, wherein the navigation console of the vehicle is configured to:
   present the drivability map on an interface of the navigation console; and
   update a navigation route to avoid road segments that have an unsafe drivability according to the first CoF threshold.

8. The method of claim 1, wherein respective vehicle performance records of the set of vehicle performance records are received in response to respective activations of vehicular traction control systems associated with the respective vehicle performance records.

9. A computer program product comprising a computer readable storage medium having program instructions embodied therewith, the program instructions executable by a processor to cause the processor to perform a method comprising:
   receiving a set of vehicle performance records including a first vehicle performance record comprising a vehicle location, a vehicle configuration, and traction control system information;
   determining, from the set of vehicle performance records, a respective Coefficient of Friction (CoF) value for respective road segments including a first CoF value for a first road segment;
   determining, from the set of vehicle performance records and the respective CoF values, a first CoF threshold for a first vehicle configuration; and
   generating a drivability map for the first vehicle configuration indicating different levels of drivability for different road segments based on the respective CoF values for respective road segments and the first CoF threshold for the first vehicle configuration.

10. The computer program product of claim 9, wherein the set of vehicle performance records is received in real-time from a plurality of driving vehicles.

11. The computer program product of claim 9, wherein the vehicle configuration includes a vehicle type, a vehicle weight, a vehicle drivetrain configuration, and a vehicle tire configuration.

12. The computer program product of claim 9, wherein the drivability map classifies road segments with CoF values below the first CoF threshold as unsafe.

13. The computer program product of claim 9, wherein the first CoF value is calculated according to a frictional force divided by a normal force, wherein the frictional force is a function of the traction control system information, and wherein the normal force is a function of a road grade and a vehicle weight.

14. The computer program product of claim 9, wherein the method further comprises:
   transmitting the drivability map to a navigation console of a vehicle having the first vehicle configuration.

15. The computer program product of claim 14, wherein the navigation console of the vehicle is configured to:
   present the drivability map on an interface of the navigation console; and
   update a navigation route to avoid road segments that have an unsafe drivability according to the first CoF threshold.

16. The computer program product of claim 9, wherein respective vehicle performance records of the set of vehicle performance records are received in response to respective activations of vehicular traction control systems associated with the respective vehicle performance records.

17. A system comprising:
- a server storing:
    - crowd-sourced vehicle performance records including traction control system information;
    - Coefficient of Friction (CoF) values for road segments, wherein the CoF values are based on the crowd-sourced vehicle performance records;
    - CoF thresholds for vehicle configurations, wherein the CoF threshold are based on the crowd-sourced vehicle performance records and the CoF values; and
    - drivability maps for respective vehicle configurations indicating passable and impassable road segments based on the CoF values and the CoF thresholds; and
- a navigation console associated with a vehicle having a first vehicle configuration, wherein the navigation console stores a drivability map for the first vehicle configuration that is received from the server, wherein the navigation console further stores a route that is based on the drivability map.

18. The system of claim 17, wherein one of the crowd-sourced vehicle performance records includes a vehicle location, a vehicle type, a vehicle weight, a vehicle drivetrain configuration, a vehicle tire configuration, and the traction control system information.

19. The system of claim 17, wherein the crowd-sourced vehicle performance records are received by the server in real-time from a plurality of driving vehicles.

20. The system of claim 17, wherein the first vehicle configuration is based on a vehicle type, a vehicle weight, a vehicle drivetrain, and a vehicle tire configuration.

* * * * *